UNITED STATES PATENT OFFICE.

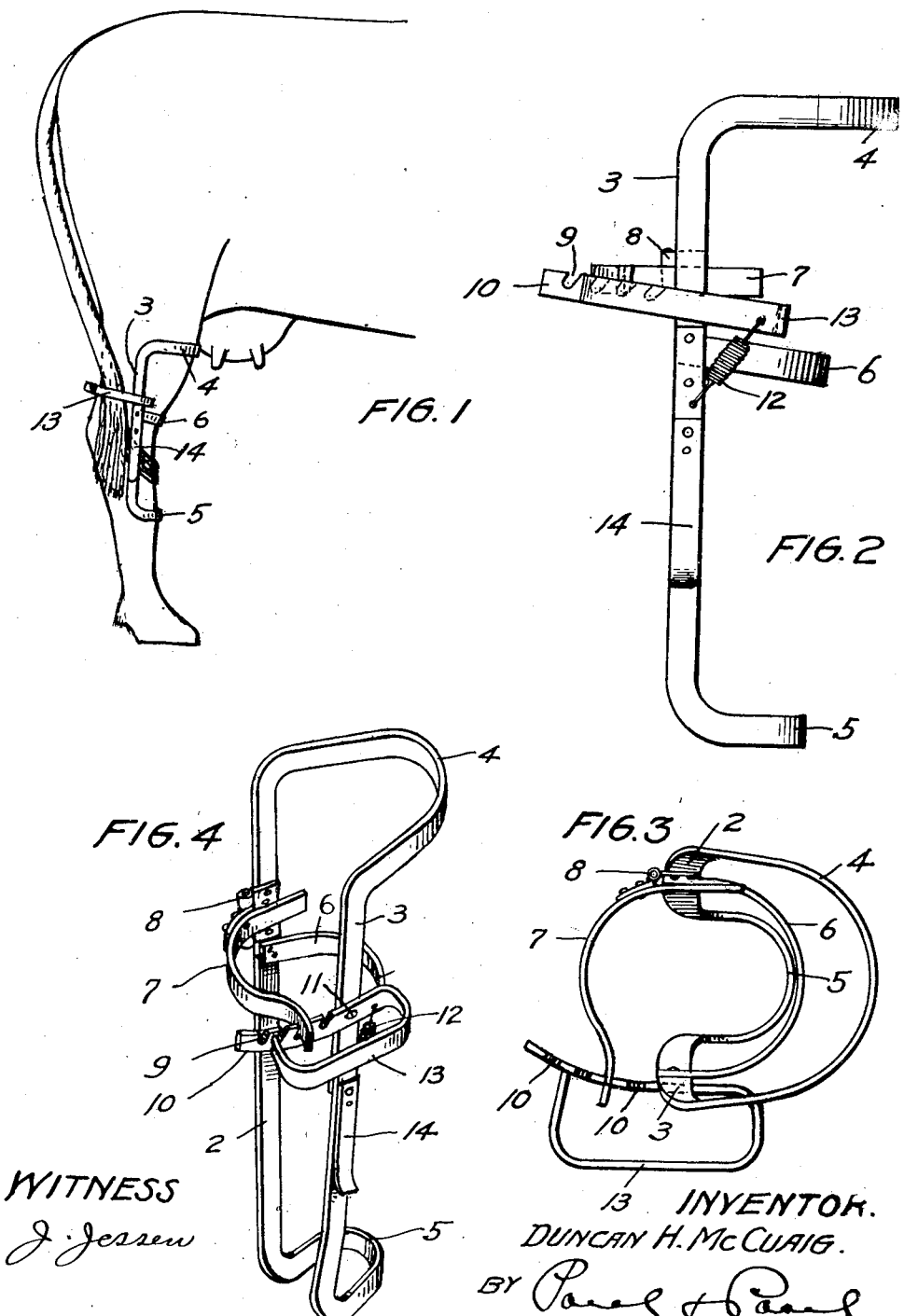

DUNCAN H. McCUAIG, OF WAHKON, MINNESOTA.

ANTIKICKER FOR COWS.

1,337,406.  Specification of Letters Patent.  Patented Apr. 20, 1920.

Application filed March 24, 1919. Serial No. 284,524.

*To all whom it may concern:*

Be it known that I, DUNCAN H. McCUAIG, a citizen of the United States, resident of Wahkon, county of Mille Lacs, State of Minnesota, have invented certain new and useful Improvements in Antikickers for Cows, of which the following is a specification.

The object of my invention is to provide an attachment for a cow's leg which will positively prevent kicking while the cow is being milked.

A further object is to simplify and improve devices of this kind heretofore shown for the same purpose.

A further object is to provide an attachment of the type above described which will include a means for holding the cow's tail.

Other objects of the invention will appear from the following detailed description.

The invention consists generally in various constructions and combinations, all as hereinafter described and particularly pointed out in the claims.

In the accompanying drawings forming part of this specification,

Figure 1 is a view showing the device in use,

Fig. 2 is a view illustrating the device removed from the cow's leg,

Fig. 3 is a top view, showing the relative position of the parts,

Fig. 4 is a perspective view, illustrating the position assumed by the parts when the device is in use.

In the drawing, the frame of the attachment comprises bars 2 and 3 in substantially parallel relation, spaced apart to receive the cow's leg between them, having loops 4 and 5 formed at their upper and lower ends which partially embrace the cow's leg above and below the hock or joint of the hind leg, the upper loop 4 being larger than the loop 5 to adapt it for fitting the leg above the joint. The bars 2 and 3 bridge the joint on each side of the leg and coöperate with the loops 4 and 5 to hold the joint rigid and prevent the cow from kicking. A strap 6 is preferably provided, curved to fit the leg near the joint and secured at its ends to the bars 2 and 3, occupying a position near the middle of the attachment between the loops 4 and 5. For holding the device on the leg, I prefer to provide the following means:

7 represents an arm hinged at 8 to the bar 2 and curved to fit the rear portion of the leg above the hock and bridging the opening between the bars 2 and 3 and having an end portion to enter notches 9 in a ratchet bar 10 which is pivoted at 11 to the bar 3 and projects rearwardly therefrom. A spring 12 connects the forward portion of the bar 10 with the bar 3 and normally tends to hold the ratchet portion of the bar in a raised position, as indicated in Fig. 2. The pivot of the arm 7 and the pivot 11 are substantially at right angles so that when the arm 7 is engaged with one of the notches 9, it will remain in such engagement, the ratchet being held up by the tension of the spring, the operator pressing the rear end of the ratchet bar down when he inserted the arm in one of the notches. The notches are preferably arranged obliquely in the bar to further aid in preventing premature separation of the arm and bar. The forward end of the bar 10 has a rearwardly turned lower portion 13 spaced from the bar sufficiently to allow the insertion of the cow's tail between them and the bar 3 is preferably provided with a flat spring 14 below the ratchet bar under which a portion of the end of the tail may be inserted to prevent the cow from drawing it out of the loop. The device can be easily and quickly applied to the cow's leg without any particular inconvenience or discomfort to the animal except that the leg will be held rigid and the cow will be prevented from bending the joint and kicking the person milking.

The device may be made in different sizes and in various ways the details may be modified and still be within the scope of the invention.

When the device is placed on the cow's leg the arm 7 is swung backwardly to allow the insertion of the leg into the loops 4 and 5 and then the arm is swung forwardly with its lower edge contacting with the notched bar 10 and sliding thereon and automatically dropping into one of the notches when the arm reaches its adjusted position, the spring 12 tending to raise the part 10 and hold it in yielding contact with the lower edge of the arm 7.

I claim as my invention:

1. An anti-kicking attachment for a cow's leg comprising a frame having loops for bearing on the front of the leg, an arm pivoted on one side of said frame to extend across the rear of the leg, a ratchet bar mounted on the other side of the frame and extending transversely of said frame and having notches in its edge to receive the edge of said arm, means for holding said arm and notched bar together, and said bar having a rearwardly turned portion spaced from said bar to allow the insertion of the cow's tail between them.

2. An attachment for a cow's rear leg comprising a frame having loops to embrace the forward portion of the leg above and below the joint, an arm hinged on one side of said frame and adapted to swing across the rear portion of the leg when the frame has been placed thereon, a bar having notches therein pivoted on said frame and mounted to engage the lower edge of said arm and bear thereon, said arm sliding on said notched bar and engaging a notch therein upon reaching the desired adjustment, and a spring tending to tilt said ratchet bar upwardly and hold it in engagement with said arm.

In witness whereof, I have hereunto set my hand this 13th day of March, 1919.

DUNCAN H. McCUAIG.

Witnesses:
 FRANK M. SMITH,
 W. J. OREDSON.